US012565832B2

(12) United States Patent
Tackmann et al.

(10) Patent No.: US 12,565,832 B2
(45) Date of Patent: Mar. 3, 2026

(54) PROCESSING OF DIRECTIONAL SURVEY DATA RECORDED DURING ROTATIONAL DRILLING

(71) Applicant: Baker Hughes Oilfield Operations LLC, Houston, TX (US)

(72) Inventors: Gunnar Tackmann, Hannover (DE); Kai Karvinen, Hannover (DE); Veronica Vanessa Herrera Bano, Celle (DE); Daniel Herrera Anda, Celle (DE); Morten Gjertsen, Stavanger (NO); Steffen Schulze, Celle (DE)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 424 days.

(21) Appl. No.: 18/157,111

(22) Filed: Jan. 20, 2023

(65) Prior Publication Data

US 2023/0235659 A1    Jul. 27, 2023

Related U.S. Application Data

(60) Provisional application No. 63/301,545, filed on Jan. 21, 2022.

(51) Int. Cl.
| | |
|---|---|
| *E21B 47/022* | (2012.01) |
| *E21B 7/04* | (2006.01) |
| (Continued) | |

(52) U.S. Cl.
CPC ............ *E21B 47/022* (2013.01); *E21B 49/00* (2013.01); *G01V 11/002* (2013.01); *E21B 47/12* (2013.01)

(58) Field of Classification Search
CPC ...... E21B 47/022; E21B 49/00; G01V 11/002
(Continued)

(56) References Cited

U.S. PATENT DOCUMENTS

| | | | | | |
|---|---|---|---|---|---|
| 4,894,923 | A | * | 1/1990 | Cobern | ................ E21B 47/022 33/304 |
| 6,651,496 | B2 | * | 11/2003 | Van Steenwyk | ...... E21B 47/022 702/9 |

(Continued)

FOREIGN PATENT DOCUMENTS

WO        2015175903 A1    11/2015

OTHER PUBLICATIONS

International Search Report for International Application No. PCT/US2023/011212; Date of Search: May 9, 2023; 3 pages.

(Continued)

*Primary Examiner* — Peter J Macchiarolo
*Assistant Examiner* — Anna Josephine Saunders
(74) *Attorney, Agent, or Firm* — CANTOR COLBURN LLP

(57)        ABSTRACT

Method for obtaining a directional survey in a rotating downhole component include acquiring and generating, while rotating, sets of raw data having 3-axis magnetic field data and 3-axis gravity field data. A set of rotationally-invariant data is obtained for each of the sets of raw data to generate a first number of sets of rotationally-invariant data. An earth property value is calculated from each of the sets. An accuracy indicator is estimated for each of the sets using a respective earth property value, an earth property reference value, and an error model, to generate a plurality of accuracy indicators. A set of mean values is determined using the plurality of sets of rotationally-invariant data using a second number of sets of rotationally-invariant data of the plurality (Continued)

of sets of rotationally-invariant data. The directional survey is estimated and used to control the downhole component.

20 Claims, 5 Drawing Sheets

(51) Int. Cl.

| | |
|---|---|
| *E21B 47/024* | (2006.01) |
| *E21B 47/12* | (2012.01) |
| *E21B 49/00* | (2006.01) |
| *G01V 3/18* | (2006.01) |
| *G01V 11/00* | (2006.01) |

(58) Field of Classification Search
USPC ........ 33/304; 73/152.43, 1.79, 1.75, 152.46; 175/45, 40
See application file for complete search history.

(56) References Cited

U.S. PATENT DOCUMENTS

| | | | | |
|---|---|---|---|---|
| 10,094,850 | B2 * | 10/2018 | Brooks | E21B 7/06 |
| 12,110,786 | B1 * | 10/2024 | Al-Qarni | E21B 47/09 |
| 2016/0047224 | A1 * | 2/2016 | Wilson | E21B 7/04 |
| | | | | 175/45 |
| 2017/0241252 | A1 * | 8/2017 | Hernandez | E21B 7/00 |
| 2021/0040839 | A1 | 2/2021 | Tackmann et al. | |
| 2021/0048357 | A1 * | 2/2021 | Arevalo | E21B 7/067 |
| 2021/0356620 | A1 * | 11/2021 | Han | E21B 47/07 |
| 2023/0235659 | A1 * | 7/2023 | Tackmann | E21B 49/00 |
| | | | | 73/152.54 |
| 2025/0084750 | A1 * | 3/2025 | Wu | E21B 44/00 |

OTHER PUBLICATIONS

Written Opinion for International Application No. PCT/US2023/011212; Date of Search: May 9, 2023; 4 pages.

* cited by examiner

300

| Conventional Directional Sensor Dataset (302) | Alternative Sensor Dataset (304) |
|---|---|
| $G_x$ | $G_xH_x + G_yH_y$ |
| $G_y$ | $G_xH_y - G_yH_x$ |
| $G_z$ | $G_{xy}$ |
| $H_x$ | $G_z$ |
| $H_y$ | $H_z$ |
| $H_z$ | |

PROCESSING OF DIRECTIONAL SURVEY DATA RECORDED DURING ROTATIONAL DRILLING

CROSS REFERENCE TO RELATED APPLICATIONS

This application claims the benefit of an earlier filing date from U.S. Provisional Application Ser. No. 63/301,545, filed Jan. 21, 2022, the entire disclosure of which is incorporated herein by reference.

BACKGROUND

Embodiments described herein relate generally to downhole exploration and production efforts in the resource recovery industry and more particularly to techniques for automated geosteering and processing of directional sensor data recorded during a rotational drilling operation.

Downhole exploration and production efforts involve the deployment of a variety of sensors and tools. The sensors provide information about the downhole environment, for example, by collecting data about temperature, density, saturation, and resistivity, among many other parameters. This information can be used to control aspects of drilling and tools or systems located in the bottom hole assembly, along the drillstring, or on the surface.

SUMMARY

Embodiments of the present invention are directed to methods for performing downhole drilling operations. The methods include collecting, during rotational drilling while drilling a wellbore through a formation, raw sensor data using at least one downhole tool. A downhole processing unit is used to filter the raw sensor data using at least one error model and a local total gravity field value. One of (i) one or more time average values from the filtered raw sensor data to create a survey dataset or (ii) processed raw sensor data are obtained. A percentage of valid data from the one or more survey dataset is determined. If the percentage is equal to or exceeds a threshold, the method includes calculating a telemetry dataset associated with the drilling of the wellbore from the survey dataset, and, if the percentage is less than the threshold, the method includes calculating a telemetry dataset associated with the drilling of the wellbore from the survey dataset and applying a flag to said telemetry dataset. The telemetry dataset or the telemetry dataset and flag are transmitted to a surface processing unit.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

Referring now to the drawings wherein like elements are numbered alike in the several figures.

DETAILED DESCRIPTION

Modern bottom hole assemblies (BHAs) are composed of several distributed components, such as sensors and tools, with each component performing data acquisition and/or processing of a special purpose. An example of one type of data acquired can include downhole directional sensor data.

Figure 1:
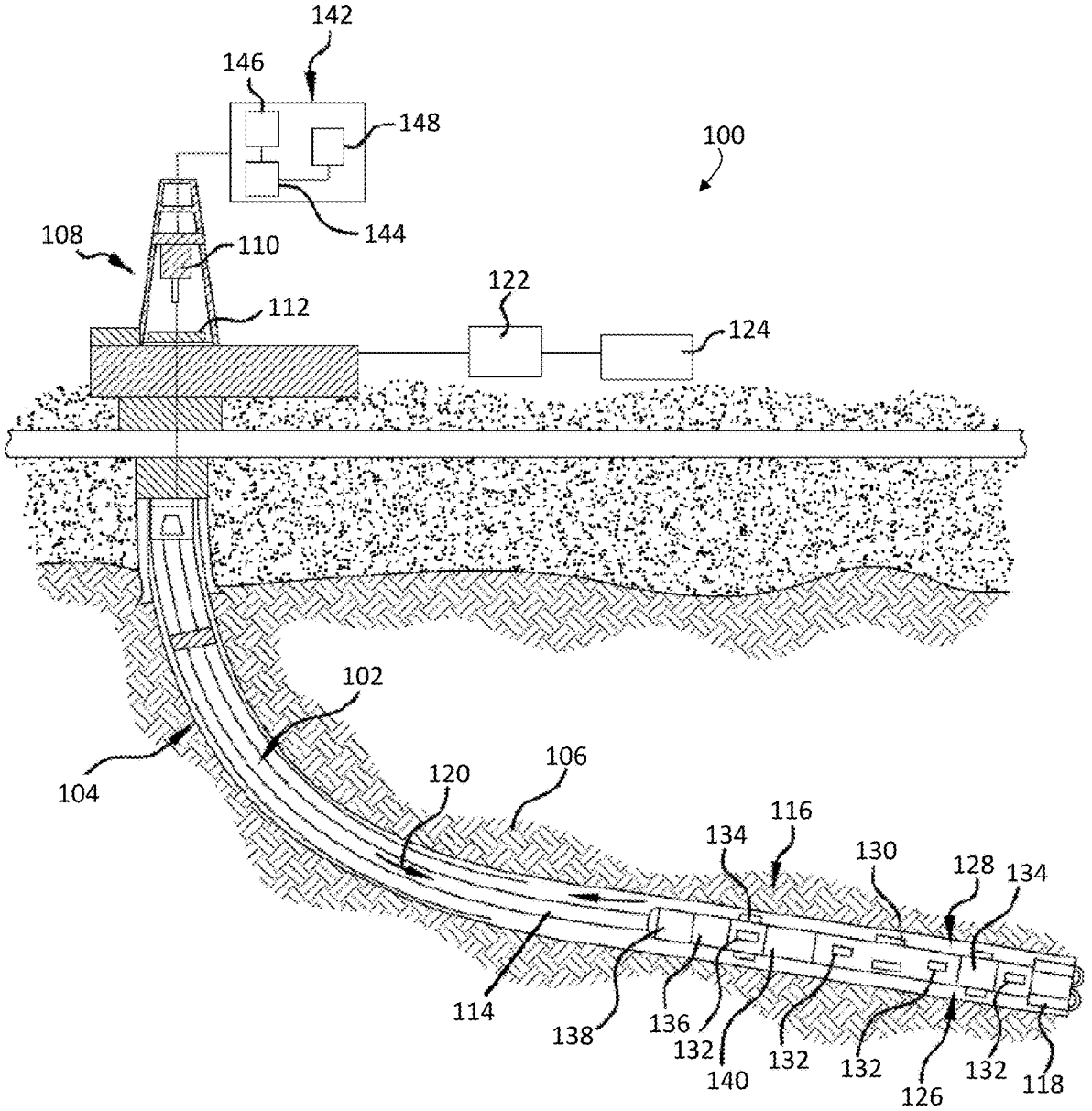
FIG. 1 depicts a schematic illustration of a wellbore operation system that can incorporate embodiments of the present disclosure.

FIG. 1 illustrates an embodiment of a system 100 for performing an energy industry operation (e.g., subsurface drilling, measurement, stimulation, and/or production). The system 100 includes a borehole string 102 that is disposed in a well or borehole 104 that penetrates at least one earth formation 106 during a drilling or other downhole operation. As described herein, "borehole" or "wellbore" refers to a hole that makes up all or part of a drilled well. It is noted that the borehole 104 may include vertical, deviated, and/or horizontal sections, and may follow any suitable or desired path. As described herein, "formations" refer to the various features and materials (e.g., geological material, rock material, reservoir fluids, etc.) that may be encountered in a subsurface environment and surround the borehole 104.

The borehole string 102 is operably connected to a surface structure or surface equipment such as a drill rig 108, which includes or is connected to various components such as a surface drive 110 (also referred to as top drive) and/or rotary table 112 for supporting the borehole string 102, rotating the borehole string 102, and lowering string sections or other downhole components into the borehole 104. In one embodiment, the borehole string 102 is a drill string including one or more drill pipe sections 114 that extend downward into the borehole 104 and is connected to one or more downhole components, which may be configured as a bottomhole assembly (BHA) 116. The BHA 116 is part of and is at least partially fixedly connected to the borehole string 102 such that rotation of the borehole string 102 causes rotation of the BHA 116. The downhole components are also referred to as tools or downhole tools.

The BHA 116 includes a disintegrating device 118 (e.g., a drill bit), which in this embodiment is driven from the surface, but may be driven from downhole (e.g., by a downhole mud motor). The system 100 may include components to facilitate circulating fluid 120, such as drilling mud/fluid, through an inner bore of the borehole string 102 and an annulus between the borehole string 102 and a wall of the borehole 104. For example, in this illustrative embodiment, a pumping device 122 is located at the surface to circulate the fluid 120 from a mud pit or other fluid source 124 into the borehole 104 as the disintegrating device 118 is rotated (e.g., by rotation of the borehole string 102 and/or a downhole motor). It is understood that the term "surface" or "surface location" in this disclosure refers to a location at the earth surface outside of the borehole and outside of the borehole string, not disposed in the drilling mud and may be accessible to operators located at a site of the system 100.

In the illustrative embodiment shown in FIG. 1, the system 100 includes a steering assembly 126 configured to steer or direct a section of the borehole string 102 and the disintegrating device 118 along a selected path. The steering assembly 126 may have any configuration suitable to direct or steer the drill bit or drill string 102. Examples of steering assemblies include, without limitation, steerable motor assemblies (e.g., bent housing motor assemblies), whipstocks, turbines, and rotary steerable systems.

In one non-limiting embodiment, the steering assembly 126 is configured as a rotary steering assembly forming the BHA 116 or part of the BHA 116. The steering assembly 126 includes a non-rotating or slowly-rotating sleeve 128 that includes one or more radially extendable pads 130 (extendable in a direction perpendicular to a longitudinal axis of the sleeve). The pads 130 may be located at different circumferential locations on the sleeve 128 and are adjustable individually or in combination to deflect the disintegrating device 118 by engaging the wall of the borehole 104.

The system 100 may also include a controller configured to operate or control operation of the pads 130 based on directional information derived from directional sensors located in the BHA 116 and/or the borehole string 102. The directional sensor(s) may be arranged at, in, or near the steering assembly 126. The directional sensor(s) can include one or more gyroscopes (e.g., gyroscope sensors or earth rate sensors), and also include one or more magnetometers (i.e., magnetic field sensors) and/or one or more accelerometers (e.g., acceleration sensors and/or gravitational sensors (gravity field sensor)).

In one embodiment, the system 100 includes one or more sensor assemblies 132 configured to perform measurements of parameters related to position and/or direction of the borehole string 102, the disintegrating device 118, and/or the steering assembly 126. The sensor assembly 132 is a sensor package comprising a plurality of directional sensors. The sensor package may be configured to rotate with the downhole string in the borehole (i.e., a rotating sensor package). In a non-limiting example, the sensor assembly 132 may include three magnetic field sensors (e.g., magnetometers), three gravity field sensors (e.g., accelerometers), and/or three angular velocity sensors (e.g., gyroscopes). In one non-limiting embodiment, the sensor assembly 132 may comprise three magnetometers and three accelerometers. In such a configuration, the three magnetometers may be configured to measure x-, y-, and z-component of the earth magnetic field and the three accelerometers may be configured to measure x-, y-, and z-component of the earth gravity field. In another non-limiting embodiment, three magnetometers and three accelerometers may be arranged or oriented such that they are mutually aligned orthogonally. As shown in FIG. 1, the sensor assemblies 132 may be located at one or more of various locations, such as on the sleeve 128, at or near the disintegrating device 118, and/or on other components of the borehole string 102 and/or the BHA 116, such as a measurement while drilling tool. The sensor assemblies of the present disclosure may be, for example and without limitation located in a container (e.g., probe based directional sensor) in an inner bore of the borehole string or may be in a tool collar (e.g., in a pocket covered by a hatch cover). For example, one sensor assembly 132 can be located on one or more stabilizer sections 134 of the steering assembly 126. The sleeve 128 may be coupled to the borehole string 102 by a bearing assembly or other mechanism that allows rotation of the sleeve independent of the rotation of the borehole string, as will be appreciated by those of skill in the art.

The system 100 may include one or more of various tools or downhole components configured to perform selected functions downhole such as performing downhole measurements/surveys (e.g., formation evaluation measurements, directional measurements, etc.), facilitating communications (e.g., mud pulser, wired pipe communication sub, etc.), providing electrical power and others (e.g., mud turbine, generator, battery, data storage device, processor device, modem device, hydraulic device, etc.). For example, the steering assembly 126 can be connected to one or more sensor devices, such as a gamma ray imaging tool 136.

In one embodiment, the system 100 includes a measurement device such as a logging while drilling (LWD) tool (e.g., for formation evaluation measurements) or a measurement while drilling (MWD) tool (e.g., for directional measurements), generally referred to as while-drilling tool 138. Examples of LWD tools include nuclear magnetic resonance (NMR) tools, resistivity tools, gamma (density) tools, pulsed neutron tools, acoustic tools, and various others. Examples of MWD tools include tools measuring pressure, temperature, vibration, bending, or directional data (e.g., magnetometer, accelerometer, gyroscope, etc.). The bottom hole assembly 116 or the system 100 can include other components, such as a telemetry assembly (e.g., mud pulser, wired pipe communication sub, etc.) or other downhole and/or surface components, systems, or assemblies.

In one non-limiting embodiment, during drilling, the sleeve 128 does not rotate or rotates at a rate or rotational speed (revolutions per minute (RPM)) that is less than the rotational rate of the disintegrating device 118 and other components of the steering assembly 128 and rotary table 112 or surface drive 110. The rate of rotation of the sleeve 128 may be denoted herein as "slow rotation". It is noted that "slow" rotation is intended to indicate a rotational rate that is less than the drilling rotational rate and is not intended to be limiting to any specific rate. A "slowly-rotating" sleeve is a sleeve that rotates at the slow rotation rate. Typical rotational speeds of a borehole string, for example, are 20 RPM to 200 RPM.

The sleeve 128 can rotate at any suitable slow rotation rate that is less than the drilling rotation rate. In one embodiment, slow rotation of the sleeve 128 is a rate between about 1 and 10 revolutions per hour (RPH). In one embodiment, slow rotation is between about 10 and 50 RPH (60°/minute and 300°/minute). In yet another embodiment, slow rotation is about 1 and 50 RPH (6°/minute and 300°/minute).

One or more downhole components and/or one or more surface components may be in communication with and/or controlled by a processor such as a downhole processing unit 140 and/or a surface processing unit 142 located at the earth surface. The downhole processing unit 140 may be part of the BHA 116 or may be otherwise arranged on or part of or disposed on the borehole string 102. The surface processing unit 142 (and/or the downhole processing unit 140) may be configured to perform functions such as controlling drilling and steering, controlling the flow rate and pressure of the fluid 120, controlling weight on bit (WOB), controlling rotary speed (e.g. revolutions per minute (RPM)) of the rotary table 112 or the surface drive 110, transmitting and receiving data, processing measurement data, and/or monitoring operations of the system 100. The surface processing unit 142, in some embodiments, includes an input/output (I/O) device 144 (such as a keyboard and a monitor), a processor 146, and a data storage device 148 (e.g., memory, computer-readable media, etc.) for storing data, models, and/or computer programs or software that cause the processor to perform aspects of methods and processes described herein.

In one non-limiting embodiment, the surface processing unit 142 is configured as a surface control unit which controls various parameters such as rotary speed, weight-on-bit, fluid flow parameters (e.g., pressure and flow rate), and other parameters or aspects of the system 100. The downhole processing unit 140, in some embodiments, may be a directional measurement controller or other processing device that controls aspects of operating the sensor assemblies 132, acquiring measurement data, and/or estimating directional parameters. The downhole processing unit 140 may also include functionality for controlling operation of the steering assembly 126 and/or other downhole components, assemblies, or systems. In one non-limiting embodiment, the method and processes described herein may be performed in the downhole processing unit 140 located within the borehole string 102 or the BHA 116 and within the borehole.

In the embodiment of FIG. 1, the system 100 is configured to perform a drilling operation and a downhole measurement operation, and the borehole string 102 is a drill string. However, embodiments described herein are not so limited and may have any configuration suitable for performing an energy industry operation that includes or can benefit from directional measurements (e.g., completion operation, fracturing operation, production operation, re-entry operation, etc.).

Figure 2:
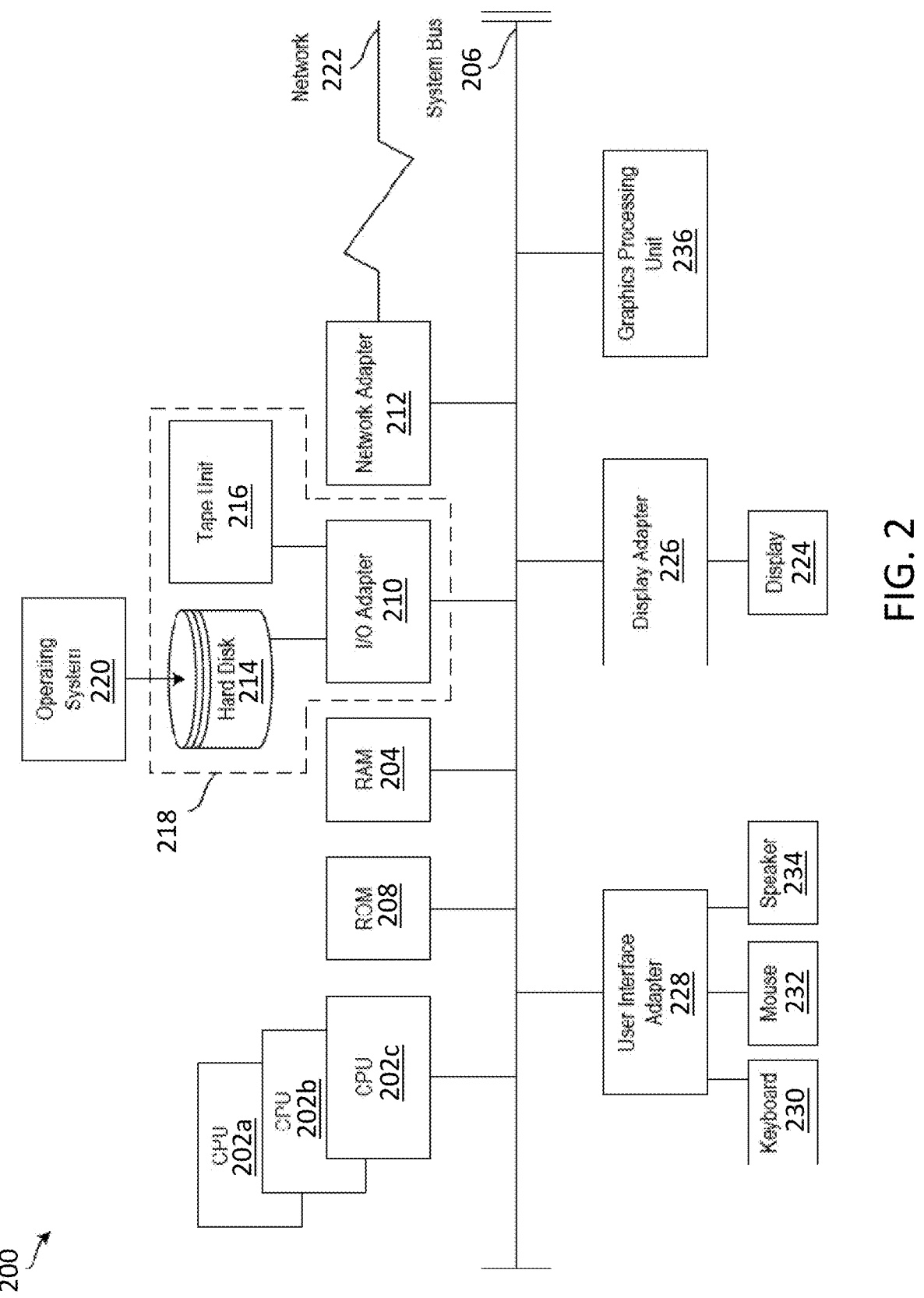
FIG. 2 depicts a block diagram of a processing system, which can be used for implementing more embodiments of the present disclosure.

It is understood that embodiments of the present disclosure are capable of being implemented in conjunction with any other suitable type of computing environment now known or later developed. For example, FIG. 2 depicts a block diagram of a processing system 200 (e.g., surface processing unit 142 and/or downhole processing unit 140 of FIG. 1), which can be used for implementing the techniques described herein. In examples, the processing system 200 has one or more central processing units 202a, 202b, 202c, etc. (collectively or generically referred to as processor(s) 202 and/or as processing device(s) 202). In aspects of the present disclosure, each processor 202 can include a reduced instruction set computer (RISC) microprocessor. The processor(s) 202, as shown, are coupled to system memory (e.g., random access memory (RAM) 204) and various other components via a system bus 206. Read only memory (ROM) 208 is coupled to the system bus 206 and can include a basic input/output system (BIOS), which controls certain basic functions of the processing system 200.

Further illustrated in FIG. 2 are an input/output (I/O) adapter 210 and a network adapter 212 coupled to the system bus 206. The I/O adapter 210 can be a small computer system interface (SCSI) adapter that communicates with a memory, such as a hard disk 214 and/or a tape storage drive 216 or any other similar component(s). The I/O adapter 210 and associated memory, such as the hard disk 214 and/or the tape storage device 216, may be collectively referred to herein as a mass storage 218. An operating system 220 for execution on the processing system 200 can be stored in the mass storage 218. The network adapter 212 may be configured to interconnect the system bus 206 with an outside network 222 enabling the processing system 200 to communicate with other systems and/or remote systems (e.g., internet, extranet, and/or cloud-based systems).

A display (e.g., a display monitor) 224 is connected to the system bus 206 by a display adaptor 226, which can include, for example, a graphics adapter to improve the performance of graphics intensive applications and a video controller. In one aspect of the present disclosure, the adapters 210, 212, and/or 226 can be connected to one or more I/O busses that are connected to system bus 206 via an intermediate bus bridge (not shown), as will be appreciated by those of skill in the art. Suitable I/O buses for connecting peripheral devices such as hard disk controllers, network adapters, and graphics adapters typically include common protocols, such as the Peripheral Component Interconnect (PCI). Additional input/output devices are shown connected to the system bus 206 via a user interface adapter 228 and the display adapter 226. For example, as shown, a keyboard 230, a mouse 232, and speaker 234 can be interconnected to the system bus 206 via the user interface adapter 228, which can include, for example, a Super I/O chip integrating multiple device adapters into a single integrated circuit.

In some aspects of the present disclosure, and as shown, the processing system 200 includes a graphics processing unit 236. Graphics processing unit 236 may be a specialized electronic circuit designed to manipulate and alter memory to accelerate the creation of images in a frame buffer intended for output to a display (e.g., display 224). In general, the graphics processing unit 236 is very efficient at manipulating computer graphics and image processing and has a highly parallel structure that makes it more effective than general-purpose CPUs for algorithms where processing of large blocks of data is done in parallel.

Thus, as configured herein, the processing system 200 includes processing capability in the form of processors 202, storage capability including system memory (e.g., RAM 204 and mass storage 218), input means such as keyboard 230 and mouse 232, and output capability including speaker 234 and display 224. In some aspects of the present disclosure, a portion of system memory (e.g., RAM 204 and mass storage 218) may be configured to collectively store an operating system (e.g., operating system 220) to coordinate the functions of the various components shown in the processing system 200.

It will be appreciated that the processing system 200 of FIG. 2 is presently described as a surface system (e.g., surface processing unit 142 of FIG. 1). However, it will be appreciated that similar electronic components may be employed in downhole systems (e.g., as part of a BHA and/or downhole processing unit 140). In such configurations, certain features of the processing system may be omitted. For example, in a BHA system, the user interface components may be omitted. Further, the system bus may be arranged to span multiple different downhole components and the network connection may be a communication means (e.g., telemetry (mud pulse, electro-magnetic, acoustic, etc.), wired connection, wireless connection, or the like) that is configured to enable communication between a surface system and the BHA system.

In accordance with embodiments of the present disclosure, a directional sensor data processing approach is provided. Directional sensor data may also refer to herein as directional sensor readings. The directional sensor data processing of the present disclosure enables quality-controllable, downhole processed sensor data that is derived from sensors that is recorded in a drill string and during rotation of the borehole string. Conventionally, directional downhole sensor data is obtained in a non-rotating state of the borehole string. That is, conventionally, directional downhole sensor data is typically obtained during a non-drilling, non-rotating state. Conventional measurement-while-drilling (MWD) directional wellbore surveying is based on gravity, magnetic field, or angular velocity recordings that are obtained during standstill of the borehole string. The result of this is an increase in total drilling time, due to non-drilling operations while collecting the directional sensor data. This increased time, particularly during non-drilling/non-rotating operations, can increase chances for stuck-pipe events of the borehole string in the wellbore. Nevertheless, static directional sensor readings (acquired non-rotating directional sensor readings) may be used to enable quality control for sensor readings obtained while rotating the borehole string and during drilling.

For example, during a static directional sensor data collection, 6-axis readings (e.g., 3-axis (x, y, z) accelerometer, 3-axis (x, y, z) magnetometer) enable directional sensor data quality control that is directly connected to a wellbore positioning uncertainty error model. Such model may be implemented in a surface processing unit at the surface or in a downhole processing unit in the borehole. Such a quality control process is typically required for providing accurate and definitive wellbore directional surveys. A directional survey is calculated from a directional sensor dataset. A directional survey includes direction and location information of the downhole component in the earth formation or the earth crust. A directional survey comprises at least azimuth, inclination, and depth information (e.g., true vertical depth (TVD) and/or measured depth (MD)). In some embodiments, a directional survey comprises azimuth, inclination, north-south coordinate, east-west coordinate, and down coordinate (e.g., true vertical depth). Using the directional sensors in the downhole component, the azimuth, the inclination, the north-south coordinate, and the east-west coordinate may be determined downhole (i.e., downhole survey information). The depth information (TVD) is commonly added at the earth surface to directional survey information calculated at the earth surface from transmitted directional sensor data to achieve a surface directional survey. In an alternative embodiment, the downhole component may be configured to detect depth information downhole by a downhole depth measurement or the depth information may be transmitted by a downlink from a surface location to a downhole location. With depth information available downhole, the downhole survey information calculated downhole from directional sensor data may be completed downhole to a downhole directional survey and may be used for automated directional drilling to achieve a pre-defined borehole trajectory without steering the drill string (e.g., steering assembly) from the earth surface (e.g., surface controller, or human operator) by transmitting steering controls downhole to the drillstring (e.g., by a downlink).

Directional sensor reading quality control parameters employing earth field values or earth property values (e.g., total gravity field, total magnetic field, and magnetic dip) need to be assessed against earth field reference values or earth property reference values (e.g., total gravity reference field, total magnetic reference field, and magnetic reference dip). The earth property values are calculated from the directional sensor readings and are compared with the earth property reference values. Total magnetic field and magnetic dip can change significantly (e.g., with respect to acceptance limits) over depth and time. Further, depending on the well direction, different directional sensor datasets processing methods may be applied on static directional sensor readings to be used in order to perform so-called axial magnetic correction, in which the z-component of the earth magnetic field reading $H_z$ is replaced by a value derived from a total magnetic reference field and magnetic reference dip in addition to the remaining directional sensor readings. Axial directional sensor readings are invariant under rotation of the borehole string or tool rotation, but the cross-axial directional sensor readings will oscillate around zero with an amplitude that depends on the tool orientation (i.e., inclination of the tool in the borehole). Axial directional sensor readings refer to the longitudinal axis of the borehole string or the tool.

As used herein, and by convention, the directional sensor that measures the directional parameter (e.g., magnetic field, gravitational force, angular velocity) along the direction parallel to the longitudinal axis of the tool is the z-coordinate directional sensor (e.g., $H_z$, $G_z$). Further, as used herein and by convention, the cross-axial directional sensors measuring the directional parameter perpendicular to the longitudinal axis (z-coordinate direction) of the tool are the x-coordinate and y-coordinate directional sensors (e.g., $H_x$, $H_y$, $G_x$, $G_y$). The frequency of the oscillation of the cross-axial directional sensor readings is defined by the tool rotation (rotational speed), which is typically between 20 and 200 revolutions per minute (RPM) and may be between 0.3 to 3.3 Hz. Simple low-pass filtering of the cross-axial directional sensor readings, which is required to filter mechanical vibrations of the downhole component from the directional sensor readings, is not possible due to the low oscillation frequency the cross-axial directional sensor readings will vary with. Only vibration frequencies (e.g., noise, vibration) significantly higher than the frequency of the downhole string oscillation may be reduced by conventional low-pass filtering applied to the directional sensor readings (directional sensor datasets) acquired during rotating operation. Accordingly, noise and vibration induced data (e.g., signals) on directional sensor readings acquired during a while-rotating operation cannot adequately be removed without removing relevant directional parameter information modulated by the tool rotation. As a result, the 6-axis rotating directional sensor datasets are not suited for conventional directional sensor datasets processing and quality control process as applied to static directional sensor datasets.

In view of this, and the lack of ability to use conventional data (e.g., 6-axis conventional directional sensor datasets) during rotating operations, embodiments of the present disclosure are directed to an alternative processing method of obtaining and employing directional sensor datasets that are collected during rotation (e.g., for pre-processing, quality control, and directional sensor datasets corrections). To achieve this, rather than utilizing the 6-axis directional sensor readings from accelerometers and magnetometers, alternative data may be feasible, such as derived from the 6-axis directional sensor readings. These alternative data utilize rotationally-invariant directional parameters (i.e., data that do not vary with rotation around the z-axis or longitudinal axis of a given tool). The approach combines downhole-processing of the derived rotationally-invariant directional parameters based on a data selection process or alternatively a data rejection process, using error model expectation values and a minimum rotational speed threshold. As such, embodiments of the present disclosure enable an advanced quality control for directional sensor readings recorded during rotating operation, such as the drilling process. Additional application of surface data quality control guarantees industry standard directional survey quality.

Figures 3, 4:
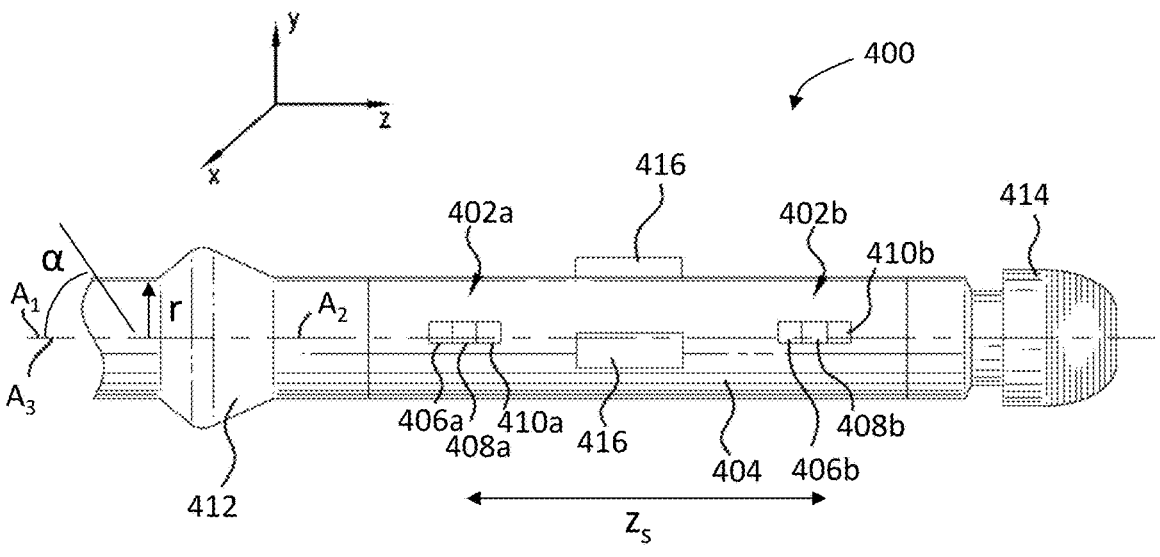
FIG. 3 is a chart illustrating components of a conventional raw sensor dataset and an alternative sensor dataset obtained in accordance with embodiments of the present disclosure.
FIG. 4 is a schematic illustration of a downhole tool that may be used to implement embodiments of the present disclosure.

Referring to FIG. 3, a table 300 illustrating a conventional directional sensor dataset 302 and an alternative sensor dataset 304 obtained in accordance with embodiments of the present disclosure is shown. The conventional directional sensor dataset 302 is obtained while rotating. That is, the conventional directional sensor dataset 302 is obtained during rotating operation. As shown, the conventional directional sensor dataset 302 includes gravitational data ($G_x$, $G_y$, and $G_z$) which may be accelerometer readings and magnetic field data ($H_x$, $H_y$, and $H_z$) which may be magnetometer readings. As a result, the conventional directional sensor dataset 302 is a 6-axis dataset comprising three accelerometer readings and three magnetometer readings. As noted, this data is obtained with the BHA or other component having the respective directional sensors during a rotating state of the system. The conventional directional sensor dataset 302 may be used for calculating a directional survey during a rotating operation. The conventional directional sensor dataset 302 comprises oscillating cross axial components ($H_x$, $H_y$, $G_x$, $G_y$) and is subject to the earlier described difficulties within the data processing to calculate a directional survey. It is understood that the same kind of data set as the conventional directional sensor dataset 302 is used with static directional sensor readings to calculate a static directional survey (i.e., non-rotating). Therefore, the method of deriving a rotational directional survey does not require technical modifications with respect to the directional sensor configuration (e.g., number or orientation of sensors).

In contrast, the alternative sensor dataset 304, derived from the conventional directional sensor dataset 302, is rotationally-invariant. That is, the alternative sensor data set 304 does not change with the tool rotation. In contrast to the conventional directional sensor dataset 302, the alternative sensor dataset 304 is not modulated by an oscillation frequency according to the rotational speed of the tool rotation. The alternative sensor dataset 304 is also referred to herein as to a rotationally-invariant dataset. As will be appreciated by those of skill in the art, the directional sensor readings $G_x$, $G_y$ and $H_x$, $H_y$ are rotationally variant with respect to the longitudinal axis of the tool (i.e., parallel to the z-axis), whereas directional sensor readings $G_z$, $H_z$ are rotationally invariant as they represent directions along the longitudinal axis of the tool. In order to perform continuous directional surveying, a set of rotationally-invariant parameters is employed. By using such a set of rotationally-invariant parameters, one degree of freedom is lost (i.e., rotation around the z-axis of the tool). However, such a set of rotationally-invariant parameters allows calculation of at least a part of a directional survey (such as azimuth and inclination). One example of such a set or rotationally-invariant parameters can be found in U.S. Pat. No. 4,894,923, entitled "Method and apparatus for measurement of azimuth of a borehole while drilling," granted Jan. 23, 1990, the contents of which are incorporated herein in their entirety. Such example data may be represented as: $G_x H_x +$ $G_y H_y$, $G_x H_y - H_x G_y$, $G_{xy}$, $G_z$, $H_z$. It shall be understood that this set is not unique and other sets of mathematically equivalent parameters (i.e., rotationally-invariant) exist and may be employed with embodiments of the present disclosure.

A sensor package for obtaining the conventional directional sensor dataset 302 has six sensors. Specifically, the sensor package of the present disclosure employs three accelerometers and three magnetometers, each arranged as a respective sensor triad configured to detect the x-, y-, and z-components of the gravity field and earth magnetic field, respectively. Both sensor triads consist of sensors that are mutually aligned orthogonally. That is, the mutually aligned sensors detect three orthogonal components of the respective earth field, such as earth magnetic field or gravity field. It will be understood that the various directions are parallel, regardless of the specification parameter. For example, $G_z$ is parallel to $H_z$, $G_x$ is parallel to $H_x$, and $G_y$ is parallel to $H_y$, while $G_z$ and $H_z$ are orthogonal to $G_y$ and $H_y$ and are orthogonal to $G_x$ and $H_x$, and $G_x$ and $H_x$ are orthogonal to $G_y$ and $H_y$. Further, the sensor triads are aligned with each other, such that the x-, y-, and z-components (e.g., magnetometer) for each sensor triad is parallel or aligned with the x-, y-, and z-components of the other sensor triad (e.g., accelerometer). The axes perpendicular to the longitudinal axis of the bottom-hole assembly (BHA) are called the x-axis and the y-axis, respectively, and the axis along the longitudinal axis of the BHA is called the z-axis.

The sensors in the sensor package may be calibrated for temperature drifts or other downhole environment and operation impacts/influences using at least one calibration parameter. The sensor package is typically mounted within a BHA or otherwise mounted to a downhole string and configured to rotate with the downhole string or components of the downhole string (such as a sleeve or stabilizer). The sensor package may be mounted along the centerline of the drill string, such that the z-components of each sensor package or each sensor triad are aligned with a tool centerline. It will be appreciated that the sensor package can be mounted at different axial positions along the drill string. For example, the sensor package can be arranged close to the end of the BHA/downhole tool (e.g., bit) or may be arranged farther uphole along the drill string from the distal end (e.g., bit). It will be appreciated that, for at least the magnetometer triad, magnetic interference levels (due to other tools or magnetic particles in the earth formation of drilling fluid) must be sufficiently small to prevent improper interferences, as done with directional sensor packages used for non-rotating measurements. It is to be understood that the magnetometer triad and the accelerometer triad may be mounted at the same position or nearly the same position (e.g., some centimeters apart) or may be spaced apart by a small distance (e.g., 1 m to 5 m) along the longitudinal axis of the drill string. In an alternative embodiment, and for example as shown in FIG. 4, a magnetometer triad and an accelerometer triad may be arranged at a separation distance $Z_s$ along the longitudinal axis of the drill string from each other. Further, in some embodiments, the z-component of the sensor packages may not be aligned with the tool center line but may form an angle $\alpha$ to the centerline. In some embodiments, the sensor package may not be mounted along the centerline of the drill string but may be arranged or positioned at a distance r from the centerline.

A downhole assembly 400 that may be used for collecting the dataset(s) described with respect to FIG. 3 is illustratively shown in FIG. 4. The downhole assembly 400 shows an embodiment of a rotary steering assembly and components of a system for monitoring and estimating directional parameters and/or obtained downhole directional survey data (e.g., tool azimuth, inclination, tool face, etc.). The downhole assembly 400 includes one or more sensor assemblies 402a, 402b. In this embodiment, the sensor assemblies 402a, 402b are disposed on and fixed relative to a sleeve 404 of the rotary steering assembly, so that the sensor assemblies 402a, 402b rotate with the sleeve 404. The sensor assemblies 402a, 402b are located in the sleeve and at a distance run from a longitudinal axis $A_1$ of the downhole assembly 400 (centerline of the downhole assembly). However, as noted above, the downhole assembly 400 and/or a BHA may include any number of sensor assemblies disposed at any suitable location(s). The one or more sensor assemblies 402a, 402b may include only one sensor, such as an angular velocity sensor (e.g., gyroscope), an acceleration sensor (e.g., accelerometer), or a magnetic field sensor (e.g., magnetometer), or alternatively, multiple sensors, such as multiple gyroscopes, multiple accelerometers, or multiple magnetic sensors, or combinations thereof. The sensor assemblies 402a, 402b may include multiple sensors of different types, such as a gyroscope and an accelerometer, a gyroscope and a magnetometer, an accelerometer and a magnetometer, or a gyroscope, a magnetometer, and an accelerometer.

The sensor assemblies 402a, 402b, in this embodiment, are located at a distance $Z_s$ apart from each other, each include at least an accelerometer sensor 406a, 406b, and a magnetometer sensor 408a, 408b. The accelerometer sensor (triad) 406a, 406b may be configured to detect a gravitational force and to detect a gravitational force direction. The magnetometer sensor (triad) 408a, 408b may be configured to measure a local magnetic field and to detect a magnetic field direction. It will be appreciated that in some embodiments an optional gyroscopic measurement sensor (triad) or gyroscope device (gyroscope) 410a, 410b may be included in the sensor assemblies 402a, 402b. The gyroscope 410a, 410b is configured to measure angular velocity relative to its inertial position (corresponding to the orientation axis) and can be used to determine parameters including true north and the earth rate. The gyroscope device may be add-on sensors that are configured to generate related information that may help to improve the directional survey (e.g., the azimuth information) as described in U.S. Patent Application pre-Grant Publication No. 2021/0040839, entitled "Correction of gyroscopic measurements for direction drilling," published Feb. 11, 2021, the contents of which are incorporated herein in their entirety. In some embodiments, the gyroscope may be omitted, and the processes described herein may be employed using a system having only accelerometer sensors 406a, 406b and magnetometer sensors 408a, 408b.

The gyroscope devices 410a, 410b may be of any suitable type, such as MEMS gyroscopes, mechanical gyroscopes, fiber optic gyroscopes, etc. The accelerometer sensors 406a, 406b may be any suitable type, such as MEMS accelerometers, piezoelectric accelerometers, strain gauge-based accelerometers, silicon accelerometers, etc. The magnetometer sensors 408a, 408b may be any suitable type, such as fluxgate magnetometers, induction based magnetometers, Faraday magnetometers, Kerr magnetometers, magnetostriction magnetometers, etc.

The gyroscope devices 410a, 410b can include a single axis gyroscope, a two-axis gyroscope, or a three-axis gyroscope. A two- or three-axis-gyroscope may be an assembly of two or three single axis gyroscopes. The two axes of the two-axis-gyroscope or the three axes of the three-axis-gyroscope, in one embodiment, are orthogonal to each other. In other embodiments, the two axes of the two-axis-gyroscope or the three axes of the three-axis-gyroscope may define angle(s) that are different to 90 degrees (i.e., not orthogonal), but are not parallel to each other. In one embodiment, the three axes of the three-axis-gyroscope may have an angle different than 90 degrees to each other and there exists no plane comprising all three axes. Likewise, the magnetometer sensors 408a, 408b can include a single-axis, two-axis, or three-axis magnetometer, and the accelerometer sensors 406a, 406b can include a single-axis, two-axis, or three-axis accelerometer. A two- or three-axis-accelerometer or magnetometer may be an assembly of two or three single axis accelerometers or magnetometers. The axes of the accelerometer sensors 406a, 406b or magnetometer sensors 408a, 408b may have orientations that are the same as or similar to the orientations of the other devices 406a, 406b, 408a, 408b, 410a, 410b, as will be appreciated by those of skill in the art.

As shown in FIG. 4, the axes of the downhole assembly 400 include a z-axis parallel to the longitudinal axis $A_1$ of the downhole assembly 400 or parallel to the longitudinal axis $A_2$ of a borehole string, and x- and y-axes are orthogonal to the z-axis. The x- and y-coordinates are in an x-y-downhole-assembly-plane. The x-y-downhole-assembly-plane in the downhole assembly 400 is perpendicular to the z-axis or perpendicular to the longitudinal axis $A_1$ of the downhole assembly 400. A longitudinal axis $A_3$ of the sleeve 404 coincides with the axis $A_1$ of the downhole assembly 400. An x-y-borehole-string-plane is perpendicular to the z-axis or longitudinal axis of the borehole string. If the borehole string is not curved and/or there is no sag, the x-y-borehole-string-plane and x-y-downhole-assembly-plane are parallel to each other.

The sensor assemblies 402a, 402b (and a processing device such as a downhole processing unit described above) form part of a directional measurement system that utilizes measurement data from the sensor assemblies 402a, 402b to estimate directional parameters, such as BHA toolface, inclination, and azimuth. The system may also estimate parameters related to a direction, such as the earth rotational rate (the earth rate) and true north, true east, magnetic north, magnetic east, highside (gravity), and lowside (gravity).

As shown in FIG. 4, the downhole assembly 400 includes a stabilizer section 412. At an end of the downhole assembly 400 is a disintegrating device 414. The sleeve 404 of the rotary steering assembly includes one or more radially extendable pads 416 (extendable in a direction perpendicular to the longitudinal axis $A_3$ of the sleeve 404). The pads 416 may be located at different circumferential locations on the sleeve 404 and are adjustable individually or in combination to deflect the disintegrating device 414 by engaging a wall of a borehole, as will be appreciated by those of skill in the art.

Using the tool in FIG. 4 or similar systems and the rotationally-invariant alternative sensor dataset 304 described in FIG. 3, a directional survey may be obtained while-drilling or while-rotating. The alternative sensor dataset 304 is also referred to herein as a rotationally-invariant dataset and the conventional directional sensor dataset 302 is also referred to herein as a directional sensor dataset. The use of parameters that are rotationally-invariant during tool rotation enables additional downhole processing steps. These additional downhole processing steps are not currently possible for directional sensor raw data such as the conventional directional sensor dataset 302 due to the directional sensor raw data being modulated by the tool rotation. The additional downhole processing can allow for rejection of samples (e.g., data/datasets) that would not pass directional sensor data quality controls that are required for determining correct downhole information. Such rejection can be performed downhole within a downhole tool, rather than transmitting conventional directional sensor datasets to the surface before processing. To do the processing step of rejecting data for data quality reasons at the earth surface, all the directional sensor datasets (e.g., high-speed sampling), such as the conventional directional sensor dataset 302, has to be transmitted to surface. This is not possible because of the limited bandwidth of telemetered data (e.g., mud pulse telemetry, a few bits per second) does not allow the transmission of all the directional sensor datasets that are required to do the rejection of data at the earth surface.

In accordance with some embodiments of the present disclosure, a total (earth) gravity field (TGF) may be used as a quality control parameter within the downhole processing of directional sensor datasets. The reference total gravity field value only slightly varies over depth and is rather stable from location to location, which enables storing a total gravity field value in a memory of a downhole tool before running in hole (i.e., preload the data at the surface), and only in rare cases updating the value using a downlink communication from surface to a tool deployed downhole. However, directional sensor datasets acquired by acceler-ometers are sensitive to vibration and require low-pass filtering before calculating directional survey data to remove vibration induced accelerometer data components. With the directional data acquired during a rotating operation, the low-pass filtering with an adequate frequency limit (e.g., <1 Hz) is not possible without removing rotating gravity field information at the same time. Using the rotationally-invari-ant dataset 304 allows for using the total gravity field as a quality control parameter for rejecting (e.g., discarding or filtering out) rotationally-invariant datasets 304 in the down-hole processing that do not pass a quality control check (e.g., additional downhole processing step as described above) based on a total gravity field calculation using the rotation-ally-invariant dataset 304 and an error model.

The total gravity field (TGF) value can be used to perform a sample-based quality control on high-speed sampled direc-tional sensor raw data (e.g., 100 samples per second (100 Hz sample rate)) to effectively improve the data quality. In accordance with embodiments of the present disclosure, example sensor sample rates may be between 10 Hz and 500 Hz. In some embodiments, the sensor sample rate may be between 20 Hz and 200 Hz. In some embodiments, the sensor sample rate may be between 50 Hz and 150 Hz. Without limitation and in accordance with some embodi-ments of the present disclosure, the magnetometer and accelerometer may be sampled at the same time (simulta-neous sampling). In some alternative embodiments, data from different directional sensor(s) may be sampled at slightly differing instances (i.e., non-simultaneous). The total magnetic field may be calculated from the rotationally-invariant data set by:

$$TGF = \sqrt{G_{real}^2 + G_{imaginary}^2 + G_z^2}$$

wherein $G_{real}$ and $G_{imaginary}$ are calculated by:

$$G_{real} = \frac{G_x H_x + G_y H_y}{\sqrt{H_x^2 + H_y^2}} \text{ and } G_{imaginary} = \frac{G_x H_y - G_y H_x}{\sqrt{H_x^2 + H_y^2}}.$$

With the above described quality control check, quality controlled rotationally-invariant datasets (e.g., quality con-trolled alternative sensor datasets) are obtained downhole, while-drilling, within a downhole tool, prior to transmission of such quality controlled rotationally-invariant datasets to the surface for additional processing and directional survey calculation. The quality controlled rotationally-invariant datasets are derived using the rotationally-invariant datasets 304, each derived from a conventional directional sensor dataset 302, and discarding (rejecting or filtering out) rota-tionally-invariant sensor datasets that do not pass the quality control check based on the total gravity field and the error model. In another embodiment, instead of transmitting to the surface the quality controlled rotationally-invariant datasets, a partial directional survey may be calculated downhole and may be used for automated steering (e.g., geosteering) of the downhole string. The depth information required to complete the partial directional survey calculated downhole may be added either by a downhole depth measurement as known in the art and not described herein, or by transmitting the depth information from the surface to the downhole tool in a downlink.

Figure 5:
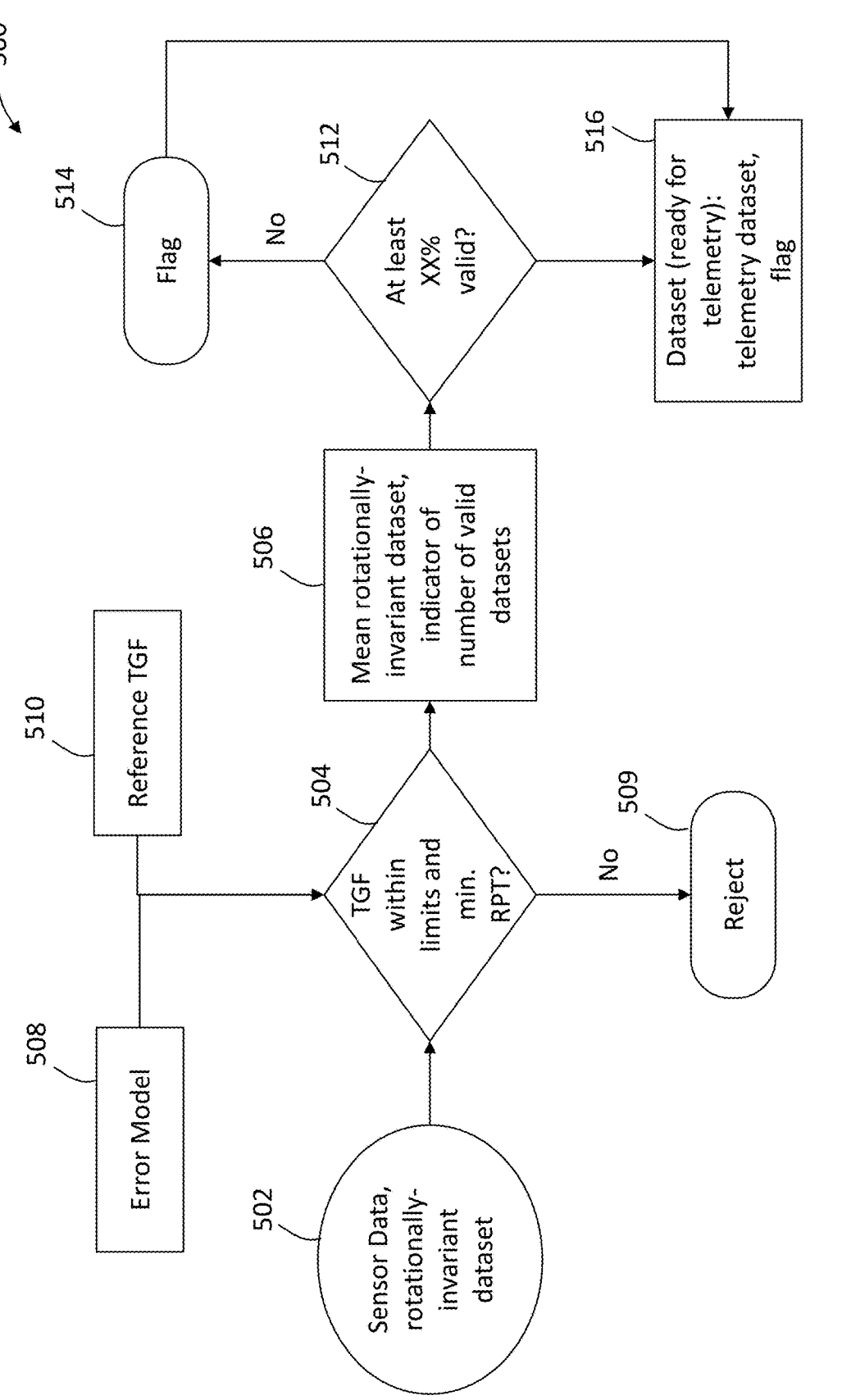
FIG. 5 is a schematic flow process to be performed downhole in accordance with an embodiment of the present disclosure.

The downhole portion of the data processing, in accor-dance with an embodiment of the present disclosure, will now be described, with reference to FIG. 5. In FIG. 5, a downhole flow process 500 in accordance with an embodi-ment of the present disclosure is shown. The flow process 500 describes the downhole data processing of directional sensor datasets performed by a processor in one or more downhole tools, assemblies, or systems, such as shown and described above.

At step (502), directional raw sensor datasets are obtained during rotation of a downhole tool. The directional raw sensor datasets are equivalent the conventional directional sensor datasets 302 and are obtained during tool rotation and/or drilling, using one or more magnetometers (magnetic field data; H-values) and one or more accelerometers (grav-ity field data; G-values). For example, the magnetic field data may be obtained using a 3-axis magnetometer assembly arranged to obtain values: $H_x$, $H_y$, $H_z$. Similarly, the gravity field data may be obtained using a 3-axis accelerometer assembly arranged to obtain values: $G_x$, $G_y$, $G_z$. the data acquisition may be obtained during a rotation of the tool making the readings (e.g., while drilling).

The directional raw sensor data comprise a set of data comprising $H_x$, $H_y$, $H_z$ and $G_x$, $G_y$, $G_z$. The set of raw sensor data may be filtered by applying conventional low-pass filters on raw sensor data (e.g., to remove noise and vibration induced sensor readings) to generate or provide filtered sensor data. The low pass filter may be applied on a series of sets of directional raw sensor data that are acquired within a certain data acquisition interval, such as 5 s, 10 s, 30 s, 60 s, or 120 s. Such low pass filter may have a frequency limit of larger than 5 Hz, larger than 10 Hz, or larger than 20 Hz for the oscillating x- and y-coordinate directional raw sensor data ($H_x$, $H_y$, $G_x$, $G_y$) and larger than 0.02 Hz, larger than 0.04 Hz, or larger than 0.06 Hz for the non-oscillating z-coordinate directional raw sensor data ($H_z$, $G_z$). The fil-tering of directional raw sensor data generates or provides filtered directional raw sensor data. In a further process of step (502), rotationally-invariant datasets 304 are deter-mined from each of the sets of directional raw sensor data acquired within a certain time interval providing a number of rotationally-invariant datasets. In some embodiments, the time interval for acquiring directional raw sensor data and the acquisition interval for applying the low-pass filter may be equal. In some embodiments, the rotationally-invariant datasets 304 may be filtered by another low-pass filter (e.g., in step (502)) before the next processing step to provide filtered rotationally-invariant datasets. The low-pass filter used for filtering the rotationally-invariant datasets 304 may have a frequency limit of 0.01 Hz, larger than 0.03 Hz, or larger than 0.08 Hz.

At step (504), the filtered (low-pass) or unfiltered rota-tionally-invariant dataset 304 from step (502) is used to determine if a calculated total gravity field (TGF) is within acceptance limits (e.g., TGF limit) and if a minimum rota-tional rate (revolutions per time period ("RPT")) is present during the data acquisition of step (502). A total gravity field value is calculated from each of the rotationally-invariant datasets 304. In step (504) each of the calculated total gravity field values is compared with a reference total gravity field value and a difference total gravity field value may be determined for each of the calculated total gravity field values. A difference total gravity field value is the difference between the calculated total gravity field value and the reference total gravity field value. Based on the reference total gravity field value, an error model (508), and error model parameters, a TGF limit is determined. In some embodiments, to determine the TGF limit, an initial estimated inclination may be employed (e.g., stored in the memory of the downhole tool, downlinked, or derived from a previously acquired static directional survey). An accuracy indicator is determined using the TGF limit and the difference total gravity field value. The accuracy indicator is determined for each rotationally-invariant dataset. It will be appreciated that the error model parameters are specific to a downhole tool, a directional sensor, a downhole string/BHA configuration, a well trajectory (e.g., vertical, horizontal, or anything in-between, geographic orientation, etc.), and/or an earth formation type. Relevant error model parameters include, for example and without limitation, sensor bias error(s), sensor scale factor error(s), and vibration level-related error(s).

The calculated TGF value is compared against the error model (508) and a reference TGF value (510) which is preloaded into a memory of the downhole tool. If the calculated TGF value is not within the TGF limit, or the difference total gravity field value is not below a predetermined difference total gravity field value threshold, the respective rotationally-invariant data set 304 will be rejected (509). Another reason for rejecting a rotationally-invariant dataset 304 is the rotation rate of the downhole tool is indicated as too low (e.g., no rotation or too slow of a rotation of the tool during a data acquisition interval). The rotation rate may be a number of rotations over a predefined time period, and thus may not specifically be revolutions per minute (RPM) but may be some other metric of rotational information, such as revolutions per second. The rotation rate may also be referred herein as to a rotational speed. However, if TGF limit and minimum rotation rate are satisfied, the remaining (i.e., not rejected) rotationally-invariant datasets may be used to calculate a mean rotationally-invariant dataset (506) using all rotationally-invariant datasets that are not rejected (i.e., remaining rotationally-invariant datasets) acquired or derived within the time interval.

The mean rotationally-invariant dataset calculation uses rotationally-invariant datasets calculated from sets of filtered or unfiltered directional raw sensor data that were acquired within the time interval reduced by the rotationally-invariant data sets there were rejected. The mean value calculation uses one of an arithmetic mean, a harmonic mean, or a geometric mean. In one embodiment instead of using the calculated total gravity field and the reference total gravity field, a calculated total magnetic field (calculated from $H_x$, $H_y$, $H_z$) and a reference total magnetic field, or a calculated magnetic dip and a magnetic dip reference may be used. In some embodiments, the time interval for acquiring the directional raw sensor data and the time period used to calculate the number of rotations may by equal. The remaining rotationally-invariant dataset(s) may also be referred to herein as to quality controlled dataset(s) or quality controlled rotationally-invariant dataset(s). It is to be understood that the process of rejecting, discarding, or filtering-out rotationally-invariant datasets in step (504) may alternatively be a selecting process. For example, the process at step (504) may include selecting the rotationally-invariant datasets that pass a quality control check (e.g., in contrast to rejecting those that fail). It will be appreciated that rejecting or selecting a rotationally-invariant dataset includes rejecting or selecting all data included in the respective rotationally-invariant dataset as listed in FIG. 3, set 304.

The error model (508) used in step (504) may be a position uncertainty error model. The structure of these error models is aligned with an industry standard (conventional error models) with slightly different coefficients plus error model parameters or coefficients that cover vibration (e.g., vibration level) and tool rotation-related errors. Error model parameters for vibration errors and tool rotation-related errors are not included in conventional error models (such as industry standard error models), because conventional error models are configured to quality control static directional sensor datasets acquired without rotation of the downhole tool and are not configured to quality control directional sensor datasets acquired while a rotating operation. The error model itself comprises a set of error model terms that define the error impact of different error sources on wellbore direction and wellbore position uncertainty of a directional survey stemming from different error sources such as reference field (e.g., total gravity field (TGF), total magnetic field (TMF), magnetic dip, etc.), downhole tool parameters, downhole sensor related errors and errors caused by vibration and rotation of the downhole tool. The error model (508) consists of error magnitudes (e.g., 1-sigma error expectation values) for the errors related to the different error sources, weighting functions (e.g., functions of local reference field information, tool inclination, tool azimuth, etc.) and a propagation mode (e.g., error propagation from survey station to survey station).

At step (504), when determining if the measured TGF or calculated TGF from the rotationally-invariant datasets is within acceptance limits (e.g., TGF limit), the reference TGF (510) is employed. A specific acceptance limit may be 1-sigma, 2-sigma, or 3-sigma from the respective expectation value. To determine if a rotationally-invariant dataset is acceptable or should be rejected, a total gravity field (TGF) from the rotationally-invariant dataset is calculated, as described above. The reference TGF (510) is then subtracted from the calculated TGF, and the resulting residual (difference total gravity field value) is compared to an acceptance limit that is derived from an initial estimate of inclination and a set of error model terms (e.g., error model (508)), which can include parameters/coefficients and weighting functions. The error model (508) and the parameters/coefficients and weighting functions are stored in the memory or data storage of the downhole tool.

As shown in FIG. 5, at step (506), the remaining rotationally-invariant datasets provided by step (502) are used to calculate a mean rotationally-invariant dataset. As described above, the remaining rotationally-invariant datasets used for calculating the mean rotationally-invariant dataset belong to a time interval $t_{interval}$. The time interval $t_{interval}$ associated with the mean rotationally-invariant dataset may be between 1 s to 20 s, 5 s to 30 s, 1 s to 60 s, 1 s to 120 s, or Is to 180 s, or some other predefined time interval. Further, an indication of a number of valid datasets (remaining rotationally-invariant datasets (504)) within the time interval $t_{interval}$ is obtained at step (506). The number of valid datasets in the time interval may be indicated by a percentage of valid datasets. The percentage of valid datasets may be calculated by utilizing the ratio of the number of valid datasets in the time interval and the number of acquired rotationally-invariant datasets in the time interval of step (502). The time interval used in the downhole processing can be dependent upon downhole conditions such as vibrations, RPM, ROP, maximum build/walk rate, and the like. Unless all datasets are acceptable, the number of valid datasets is smaller than the number of acquired rotationally-invariant datasets. It will be appreciated that the number of acquired rotationally-invariant datasets is equal the number of acquired sets of directional raw sensor data.

The data set from step (506) (mean rotationally-invariant dataset, rotation rate, and % valid datasets) are then analyzed at step (512). Specifically, at step (512), the percentage of valid datasets is analyzed to see if a threshold number of valid datasets are present or not. If the number (or percentage) of valid datasets is below a predetermined threshold number of valid datasets, the data may be flagged (but not rejected/deleted) at step (514). Such flagged data from step (514) (mean rotationally-invariant dataset plus flag) can then be processed into a telemetry dataset at step (516) for transmission to the surface. If at step (512) the number (or percentage) of valid datasets is equal to or exceeds the threshold number of valid datasets, the telemetry dataset is generated without additional flagging for transmission from the downhole tool to the surface. The flags applied at step (514) may include an indication of the rotational speed at which the directional raw sensor data are acquired. Without limitation, the indication of the rotational speed may be an indication of one of a minimum number of rotations (minimum rotational speed), an indication of a rotational rate, and a number of rotations. The minimum number of rotations can depend on sensor characteristics and/or the error model (508), but could be, for example and without limitation, 4, 8, or 16 revolutions in 10 seconds. The indication of rotational speed may be used at the surface to evaluate the quality of the received telemetered data, such as the received mean rotationally-invariant dataset calculated in step (506). Additional flags may be related to excessive lateral or axial vibration levels (measured with directional or auxiliary accelerometers) and other downhole condition(s) (e.g., bending, sagging). The other downhole conditions may be determined based on the same or different sensors of the downhole system (e.g., strain gauges, torque sensors).

The telemetry dataset at step (516), to be transmitted to the surface, includes the mean rotationally-invariant dataset representing directional information of the downhole tool within the time interval from step (506) and any flags that are applied or assigned at steps (512-514). The structure of the mean rotationally-invariant dataset corresponds to the structure of the alternative sensor dataset 304 in FIG. 3. The telemetry dataset may be coded using a telemetry data code before transmitting the data from the downhole tool to the surface to facilitate data transmission. The telemetry dataset may then be transmitted to the surface for display to an operator, recording, analysis, and/or further processing. The transmission may be by mud pulse telemetry or other known mechanisms for transmission of data from a downhole tool to a surface unit (or uphole tool). The transmission of the quality controlled mean rotationally-invariant dataset allows reception of quality controlled, high-speed, and rotating directional sensor datasets at surface by using a low bandwidth telemetry system. It would not be possible to transmit the high-speed directional sensor raw data to surface to do quality control of the data at surface. The uncertainty of the directional sensor datasets received at the surface as achieved through embodiments of the present disclosure is significantly reduced compared to prior art methods of transmitting rotating directional survey data to the surface. In one non-limiting embodiment, the mean rotationally-invariant dataset may be used to calculate a partial directional survey downhole in the downhole tool (e.g., inclination and azimuth) and transmit the partial directional survey to the surface. Received at the surface (e.g., at a surface unit), depth information may be added to the partial directional survey to complete it to a directional survey.

The flow process 500 may be performed during drilling and rotation of a downhole system. As such, data collection, the quality control process (504) (e.g., rejection of rotationally-invariant datasets), the calculation of the mean rotationally-invariant dataset (506), the determination of the rotational speed (506), the calculation of the valid dataset indicator (512), and the determination of the flag(s) (514) as described with respect to flow process 500 of FIG. 5 may be performed without stopping of a drilling operation. Subsequent surface processing of the telemetry dataset may be performed upon the quality controlled dataset. The flow process 500 includes performing data collection, processing, quality control all during a drilling (rotational) operation and thus can reduce or eliminate stop time associated with conventional processes for obtaining similar directional surveys.

The telemetry dataset from downhole survey processing of the flow process 500 may be sent to surface through mud-pulse or electro-magnetic telemetry, where it may be further processed. Advantageously, because the flow process 500 is performed downhole, the amount of data transmitted to the surface is constrained due to bandwidth restrictions. The further processing at surface may include, for example, total gravity field, total magnetic field, and magnetic dip values that are calculated from the telemetry dataset, subtracted from reference field values (e.g., all available on surface in real-time), and compared to surface acceptance limits derived from tool inclination, azimuth, and a surface error model that is employed. Further, at the surface, from the telemetry dataset (step (516)), final inclination and azimuth may be calculated, and measured depth values may be assigned to the telemetry dataset.

Figure 6:
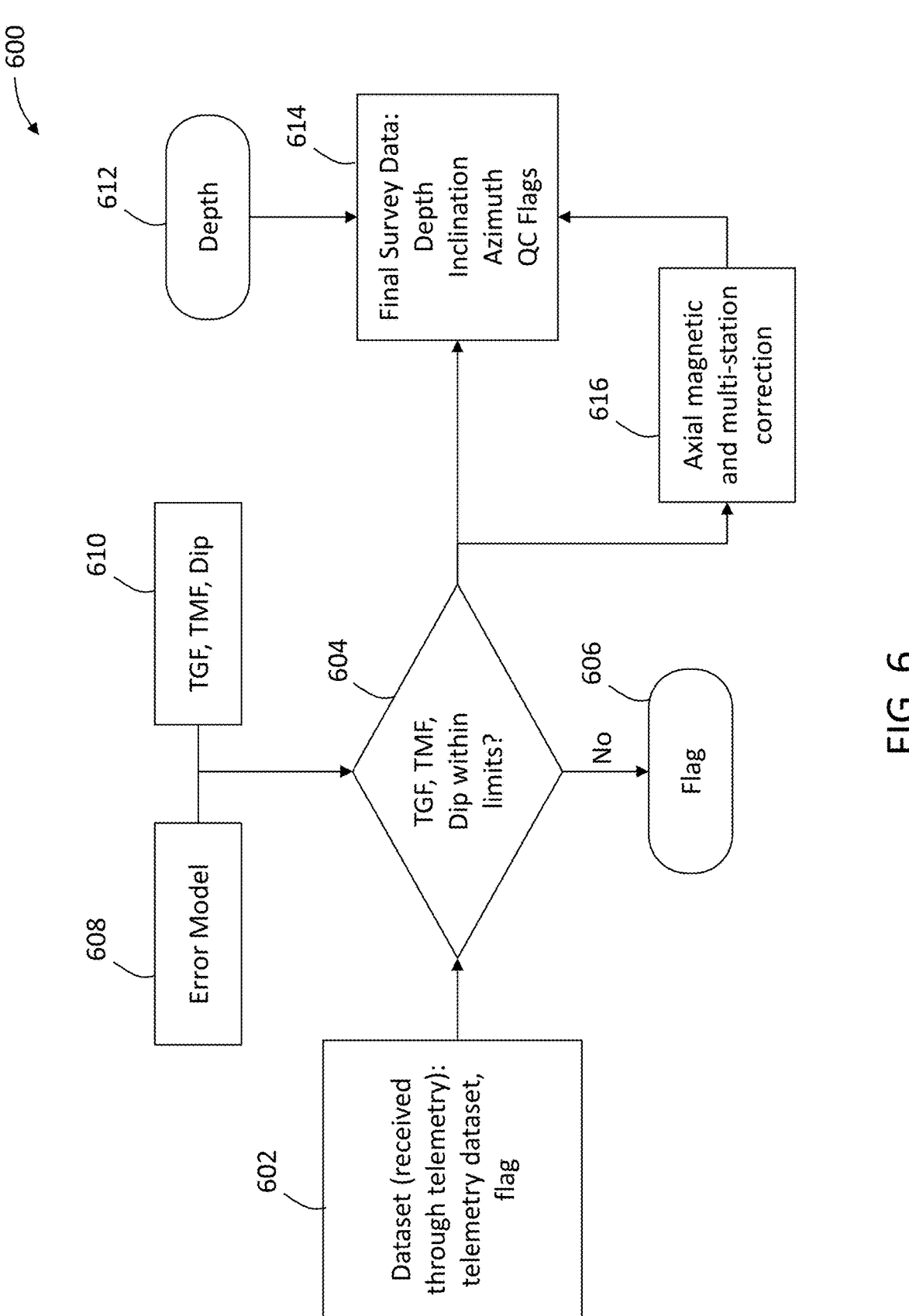
FIG. 6 is a schematic flow process to be performed at the earth surface in accordance with an embodiment of the present disclosure.

An example survey processing of the present disclosure that is realized on surface is illustrated in FIG. 6. In accordance with some embodiments of the present disclosure, and as shown in the flow process 600, additional survey data corrections can be performed before posting a directional survey.

At step (602), a telemetry dataset, obtained for example at step (516) in flow process 500 and transmitted to the surface, is provided. The telemetry dataset obtained at step (602) is selected according to the transmitted flags. Further, as stated above, the telemetry dataset is data obtained during a while-rotating operation and does not require stoppage of the drilling operation to collect such data and perform downhole processing of such data downhole prior to transmission to the surface for further surface processing in flow process 600. The telemetry dataset selection, based on the transmitted flag, may include an evaluation, using the information transmitted with the flag, whether a flagged transmitted dataset may be selected for further processing or not. The evaluation may also take into account operational conditions, such as specific borehole trajectory (e.g., vertical, inclined, horizontal), formation type (e.g., rock type), drilling conditions 9 e.g., RPM, ROP, vibration levels), measured depth, drilling fluid type, and/or a BHA configuration (e.g., drill bit type).

At step (604), the telemetry dataset is processed using a surface error model (608) (used at the earth surface, the same or different from the downhole error model (508) of flow process 500) and additional information such as the reference total gravity field (TGF), the reference total magnetic field (TMF), and magnetic dip reference information (610). The surface error model (608) and the additional information (610) may be used to determine if the telemetry dataset is within surface acceptance limits. In accordance with some embodiments, the limits are derived using surface error model parameters/coefficients and weighting functions. For example, depending on the orientation of the tool relative to the earth magnetic field or the gravity field (e.g., inclination and azimuth), the limits for the total gravity field (TGF), the total magnetic field (TMF), and the magnetic dip (dip) values can be derived. The value for each of the parameters (TGF, TMF, magnetic dip), as derived from the telemetry dataset, then has to be found within an interval defined by the local reference field values for TGF, TMF and magnetic dip, plus or minus the calculated surface error model surface acceptance limits.

If at step (604), it is determined that the telemetry dataset is not within the surface acceptance limits (e.g., with the limits of TGF, TMF, and magnetic dip), the telemetry dataset may be flagged (606) by a surface flag. This step of the process may be referred to as a surface quality control step. During the surface quality control step, data is selected based on quality control (i.e., identifying the appropriate telemetry datasets) and then, in a second part, the selected samples/data (appropriate telemetry dataset) is processed to calculate the directional survey. The surface error model may include conventional surface error model terms as used in conventional or industry standard surface error models plus additional terms and parameters/coefficients that are related to the fact that the transmitted dataset was derived from directional sensor datasets that were acquired during rotating operation. These error terms and parameters/coefficients are related to rotation errors (e.g., rotational rate of the downhole tool) and vibration errors (e.g., lateral, axial vibration of the downhole tool) on the transmitted datasets still present after the downhole data processing (process 500). In accordance with some embodiments of the present disclosure, within the processing steps performed at the surface, no mean value calculation of telemetry datasets is performed. The calculation of a mean value (mean rotationally-invariant dataset) involving a rejection/selection step is done exclusively during the downhole processing with the processor located inside the downhole tool in the borehole.

However, if such telemetry dataset is within the surface acceptance limits, the telemetry dataset is accepted and may be combined with depth information (612) to generate a directional survey at step (614). The directional survey may include azimuth, inclination, north-south, east-west, and down coordinates. In some embodiments, optionally, axial magnetic and multi-station correction may be applied to the telemetry dataset, at step (616) before generating the directional survey. The correction may include, without limitation, calculating sensor signal biases, which are caused by magnetic interference and/or sensor errors (e.g., out of calibration). These are derived using single or multiple telemetry dataset using different methods (with a telemetry dataset being a single set of readings at a single depth position). These methods make use of the local geo-reference field values. The corrections can then be applied per telemetry dataset or directional survey station (e.g., single-station) or on an entire or whole dataset (e.g., multi-station, multiple telemetry datasets). A correction that is derived from all or most telemetry datasets can be applied to all telemetry datasets or at least a portion of the telemetry datasets in the same manner (e.g., a signal bias correction or a scale factor correction).

In view of the above, embodiments of the present disclosure are directed to obtaining improved directional survey data that is determined based on directional sensor data collected during a while-rotating operation. The use of rotationally-invariant datasets that are quality controlled while downhole (in the downhole tool) enables effective rejection of rotationally-invariant datasets that do not fulfill the quality control steps describes above with process 500 (e.g., downhole error model, TGF reference) to enable surface directional survey data processing based on downhole quality controlled directional sensor datasets acquired while rotating operation. For example, the transmitted dataset is chosen in such a way that no information is lost, and the complete data can be recreated based on the transmitted dataset. If only inclination and azimuth were transmitted, surface processing and surface quality control including a surface error model would not be possible before generating the directional survey. Leaving the last calculation step to surface can enable directional survey correction and further analyses, as explained above. From the telemetry dataset, an operator can calculate downhole tool inclination and azimuth, calculate quality control parameters, enable axial magnetic correction, and enabling multi-station analysis approaches that improve overall data quality control.

Set forth below are some embodiments of the foregoing disclosure:

Embodiment 1: A method for obtaining a directional survey in a rotating downhole component, the method comprising: rotating the downhole component in a wellbore with a rotational speed, the downhole component comprising a processor, a magnetic field sensor, and a gravity field sensor; acquiring, while rotating the downhole component, raw data comprising magnetic field data from the magnetic field sensor and gravity field data from the gravity field sensor, to generate a plurality of sets of raw data, wherein each of the sets of raw data comprises 3-axis magnetic field data and 3-axis gravity field data; determining, in the downhole component, a set of rotationally-invariant data for each of the sets of raw data of the plurality of sets of raw data to generate a plurality of sets of rotationally-invariant data, the plurality of sets of rotationally-invariant data having a first number of sets; calculating, in the downhole component, an earth property value from each of the sets of rotationally-invariant data of the plurality of sets of rotationally-invariant data; estimating, in the downhole component, an accuracy indicator for each of the sets of rotationally-invariant data of the plurality of sets of rotationally-invariant data using a respective earth property value associated with each of the sets of rotationally-invariant data, an earth property reference value, and an error model, to generate a plurality of accuracy indicators; determining, in the downhole component, a set of mean values using the plurality of sets of rotationally-invariant data, wherein the determining of the set of mean values comprises using a second number of sets of rotationally-invariant data of the plurality of sets of rotationally-invariant data, wherein the second number of sets is smaller than the first number of sets, the second number of sets being determined using the plurality of accuracy indicators; estimating the directional survey using the set of mean values; and controlling the downhole component using the directional survey.

Embodiment 2: A method according to any prior embodiment, wherein the plurality of sets of raw data is acquired within a time interval using a sample rate, wherein the sample rate is larger than or equal to 50 samples per second.

Embodiment 3: A method according to any prior embodiment, wherein the time interval is between 1 s and 100 s.

Embodiment 4: A method according to any prior embodiment, further comprising estimating the rotational speed of the downhole component using at least a portion of the sets of raw data of the plurality of sets of raw data acquired within the time interval.

Embodiment 5: A method according to any prior embodiment, wherein the earth property value is at least one of a total gravity field value, a total magnetic field value, and a magnetic dip value.

Embodiment 6: A method according to any prior embodiment, wherein the estimating the accuracy indicator comprises calculating a difference between the calculated earth property value and the earth property reference value.

Embodiment 7: A method according to any prior embodiment, wherein the determining the set of mean values comprises discarding at least one set of rotationally-invariant data of the plurality of sets of rotationally-invariant data based on the rotational speed of the downhole component being below a minimum rotational speed.

Embodiment 8: A method according to any prior embodiment, wherein the controlling the downhole component comprises transmitting the set of mean values to a surface location and to operate the downhole component based on the transmitted set of mean values.

Embodiment 9: A method according to any prior embodiment, further comprising: determining a flag, wherein the flag comprises an indicator of the second number of sets; and transmitting the flag to the surface location.

Embodiment 10: A method according to any prior embodiment, wherein the flag is a ratio of the second number of sets and the first number of sets.

Embodiment 11: A method according to any prior embodiment, further comprising determining a flag, wherein the flag comprises at least one of an indicator of the rotational speed of the rotating downhole component and an indicator of a vibration level of the downhole component.

Embodiment 12: A method according to any prior embodiment, wherein the error model comprises a calibration parameter for at least one of the magnetic field sensor and the gravity field sensor.

Embodiment 13: A method according to any prior embodiment, wherein the error model provides an error expectation value, the error expectation value related to errors based on at least one of the rotational speed of the downhole component and a vibration level of the downhole component in the wellbore.

Embodiment 14: A method according to any prior embodiment, wherein the error model includes a weighting function.

Embodiment 15: A method according to any prior embodiment, wherein the directional survey is estimated downhole in the downhole component while the downhole component is rotating, and the controlling the downhole component is performed by the processor in the downhole component using the directional survey.

Embodiment 16: A method according to any prior embodiment, wherein the controlling the downhole component is performed automatically without input from a human operator.

Embodiment 17: A method according to any prior embodiment, wherein the directional survey includes at least one of an azimuth and an inclination.

Embodiment 18: A method according to any prior embodiment, wherein the directional survey further includes at least one of a north coordinate, an east coordinate, and a down coordinate.

Embodiment 19: A method according to any prior embodiment, further comprising improving the azimuth in the directional survey by using an earth rate sensor.

Embodiment 20: A system obtaining a directional survey comprising: a downhole component configured to be rotated in a wellbore with a rotational speed, the downhole component comprising a processor, a magnetic field sensor, and a gravity field sensor; wherein, while rotating, the system is configured to: acquire raw data comprising magnetic field data from the magnetic field sensor and gravity field data from the gravity field sensor, to generate a plurality of sets of raw data, wherein each of the sets of raw data comprises 3-axis magnetic field data and 3-axis gravity field data; determine, in the downhole component, a set of rotationally-invariant data for each of the sets of raw data of the plurality of sets of raw data to generate a plurality of sets of rotationally-invariant data, the plurality of sets of rotationally-invariant data having a first number of sets; calculate, in the downhole component, an earth property value from each of the sets of rotationally-invariant data of the plurality of sets of rotationally-invariant data; estimate, in the downhole component, an accuracy indicator for each of the sets of rotationally-invariant data of the plurality of sets of rotationally-invariant data using a respective earth property value associated with each of the sets of rotationally-invariant data, an earth property reference value, and an error model, to generate a plurality of accuracy indicators; determine, in the downhole component, a set of mean values using the plurality of sets of rotationally-invariant data, wherein the determining of the set of mean values comprises using a second number of sets of rotationally-invariant data of the plurality of sets of rotationally-invariant data, wherein the second number of sets is smaller than the first number of sets, the second number of sets being determined using the plurality of accuracy indicators; estimate the directional survey using the set of mean values; and control the downhole component using the directional survey.

The use of the terms "a" and "an" and "the" and similar referents in the context of describing the present disclosure (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure can be used in a variety of well operations. These operations can involve using one or more treatment agents to treat a formation, the fluids resident in a formation, a wellbore, and/or equipment in the wellbore, such as production tubing. The treatment agents can be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the present disclosure has been described with reference to an exemplary embodiment or embodiments, it will be understood by those skilled in the art that various changes can be made, and equivalents can be substituted for elements thereof without departing from the scope of the present disclosure. In addition, many modifications can be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims. Also, in the drawings and the description, there have been disclosed exemplary embodiments of the present disclosure and, although specific terms can have been employed, they are unless otherwise stated used in a generic and descriptive sense only and not for purposes of limitation, the scope of the present disclosure therefore not being so limited.

What is claimed is:

1. A method for obtaining a directional survey in a rotating downhole component, the method comprising:
   rotating the downhole component in a wellbore with a rotational speed, the downhole component comprising a processor, a magnetic field sensor, and a gravity field sensor;
   acquiring, while rotating the downhole component, raw data comprising magnetic field data from the magnetic field sensor and gravity field data from the gravity field sensor, to generate a plurality of sets of raw data, wherein each of the sets of raw data comprises 3-axis magnetic field data and 3-axis gravity field data;
   determining, in the downhole component, a set of rotationally-invariant data for each of the sets of raw data of the plurality of sets of raw data to generate a plurality of sets of rotationally-invariant data, the plurality of sets of rotationally-invariant data having a first number of sets;
   calculating, in the downhole component, an earth property value from each of the sets of rotationally-invariant data of the plurality of sets of rotationally-invariant data;
   estimating, in the downhole component, an accuracy indicator for each of the sets of rotationally-invariant data of the plurality of sets of rotationally-invariant data using a respective earth property value associated with each of the sets of rotationally-invariant data, an earth property reference value, and an error model, to generate a plurality of accuracy indicators;
   identifying a second number of sets from the plurality of sets of rotationally invariant data, using the accuracy indicator, wherein the second number of sets is smaller than the first number of sets;
   determining, in the downhole component, a set of mean values using the identified second number of sets of the plurality of sets of rotationally-invariant data;
   estimating the directional survey using the set of mean values; and
   controlling the downhole component using the directional survey.

2. The method of claim 1, wherein the plurality of sets of raw data is acquired within a time interval using a sample rate, wherein the sample rate is larger than or equal to 50 samples per second.

3. The method of claim 2, wherein the time interval is between 1 s and 100 s.

4. The method of claim 2, further comprising estimating the rotational speed of the downhole component using at least a portion of the sets of raw data of the plurality of sets of raw data acquired within the time interval.

5. The method of claim 1, wherein the earth property value is at least one of a total gravity field value, a total magnetic field value, and a magnetic dip value.

6. The method of claim 5, wherein the estimating the accuracy indicator comprises calculating a difference between the calculated earth property value and the earth property reference value.

7. The method of claim 6, wherein the estimation of the accuracy indicator comprises a minimum rotational speed and the determining the set of mean values comprises discarding at least one set of rotationally-invariant data of the plurality of sets of rotationally-invariant data based on the rotational speed of the downhole component being below a minimum rotational speed.

8. The method of claim 1, wherein the controlling the downhole component comprises transmitting the set of mean values to a surface location and to operate the downhole component based on the transmitted set of mean values.

9. The method of claim 8, further comprising:
   determining a flag, wherein the flag comprises an indicator of the second number of sets; and
   transmitting the flag to the surface location.

10. The method of claim 9, wherein the flag is a ratio of the second number of sets and the first number of sets.

11. The method of claim 8, further comprising determining a flag, wherein the flag comprises at least one of an indicator of the rotational speed of the rotating downhole component and an indicator of a vibration level of the downhole component.

12. The method of claim 1, wherein the error model comprises a calibration parameter for at least one of the magnetic field sensor and the gravity field sensor.

13. The method of claim 12, wherein the error model provides an error expectation value, the error expectation value related to errors based on at least one of the rotational speed of the downhole component and a vibration level of the downhole component in the wellbore.

14. The method of claim 12, wherein the error model includes a weighting function.

15. The method of claim 1, wherein the directional survey is estimated downhole in the downhole component while the downhole component is rotating, and the controlling the downhole component is performed by the processor in the downhole component using the directional survey.

16. The method of claim 15, wherein the controlling the downhole component is performed automatically without input from a human operator.

17. The method of claim 1, wherein the directional survey includes at least one of an azimuth and an inclination.

18. A system obtaining a directional survey comprising:
   a downhole component configured to be rotated in a wellbore with a rotational speed, the downhole component comprising a processor, a magnetic field sensor, and a gravity field sensor;
   wherein, while rotating, the system is configured to:
   acquire raw data comprising magnetic field data from the magnetic field sensor and gravity field data from the gravity field sensor, to generate a plurality of sets of raw data, wherein each of the sets of raw data comprises 3-axis magnetic field data and 3-axis gravity field data;
   determine, in the downhole component, a set of rotationally-invariant data for each of the sets of raw data of the plurality of sets of raw data to generate a plurality of sets of rotationally-invariant data, the plurality of sets of rotationally-invariant data having a first number of sets;

calculate, in the downhole component, an earth property value from each of the sets of rotationally-invariant data of the plurality of sets of rotationally-invariant data;

estimate, in the downhole component, an accuracy indicator for each of the sets of rotationally-invariant data of the plurality of sets of rotationally-invariant data using a respective earth property value associated with each of the sets of rotationally-invariant data, an earth property reference value, and an error model, to generate a plurality of accuracy indicators;

identify a second number of sets from the plurality of sets of rotationally invariant data, using the accuracy indicator, wherein the second number of sets is smaller than the first number of sets;

determine, in the downhole component, a set of mean values using the identified second number of sets of the plurality of sets of rotationally-invariant data;

estimate the directional survey using the set of mean values; and control the downhole component using the directional survey.

19. The method of claim 7, wherein the error model is specific to the downhole component.

20. The method of claim 7, wherein the accuracy indicator is determined for each set of rotationally-invariant data of the plurality of sets of rotationally-invariant data.

\* \* \* \* \*